United States Patent
Chiu et al.

(10) Patent No.: US 10,429,654 B2
(45) Date of Patent: Oct. 1, 2019

(54) VIRTUAL REALITY DISPLAY APPARATUS

(71) Applicant: Acer Incorporated, New Taipei (TW)

(72) Inventors: Yi-Jung Chiu, New Taipei (TW);
Wei-Kuo Shih, New Taipei (TW);
Yi-Huang Lee, New Taipei (TW);
Shih-Ting Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 15 days.

(21) Appl. No.: 15/802,465

(22) Filed: Nov. 3, 2017

(65) Prior Publication Data
US 2018/0348520 A1 Dec. 6, 2018

(30) Foreign Application Priority Data
Jun. 2, 2017 (TW) .............................. 106118268 A (51) Int. Cl.
G02B 27/01 (2006.01)
G06F 3/01 (2006.01)
H04N 13/106 (2018.01)

(52) U.S. Cl.
CPC .......... G02B 27/0172 (2013.01); G06F 3/011 (2013.01); H04N 13/106 (2018.05)

(58) Field of Classification Search
CPC ............ G02B 27/0101; G02B 27/0172; G02B 27/0179; G02B 27/225; G02B 27/2242; H04N 13/106; H04N 13/122; H04N 13/344; H04N 13/383; H04N 13/398; G03B 21/28; G03B 21/625
See application file for complete search history.

(56) References Cited

U.S. PATENT DOCUMENTS 7,746,570 B2 6/2010 Suzuki et al.
9,810,904 B1 * 11/2017 Bierhuizen .......... H04N 13/344
(Continued)

FOREIGN PATENT DOCUMENTS

CN 1358623 7/2002
CN 2537017 2/2003
(Continued)

OTHER PUBLICATIONS

Jongmyeong Shim et al., "Design methodology accounting for fabrication errors in manufactured modified Fresnel lenses for controlled LED illumination", Optics Express, Jul. 2015, pp. 19743-19751.

*Primary Examiner* — Sultan Chowdhury
(74) *Attorney, Agent, or Firm* — JCIPRNET (57) ABSTRACT

A virtual reality display apparatus includes at least one display and at least one optical assembly. The display provides an image beam to a left eye or a right eye of a user. The optical assembly is disposed on a transmission path of the image beam and located between the left eye or the right eye of the user and the display. The optical assembly includes at least one Fresnel lens including ring structures surrounding an optical axis thereof. Each of the ring structures includes an effective refraction surface and an optically non-effective surface connected to each other and arranged along a radial direction. A junction of the effective refraction surface and the optically non-effective surface has a round angle. The radius of curvature of the round angles of at least some of the ring structures of the Fresnel lens is smaller than 10 μm and larger than 0 μm.

18 Claims, 9 Drawing Sheets

(56) References Cited

U.S. PATENT DOCUMENTS

| | | | | |
|---|---|---|---|---|
| 2010/0061106 A1* | 3/2010 | Shyu | ............... | G02B 3/08 |
| | | | | 362/311.02 |
| 2012/0032874 A1* | 2/2012 | Mukawa | ............ | G02B 3/12 |
| | | | | 345/8 |
| 2014/0069417 A1 | 3/2014 | Bates et al. | | |
| 2015/0138654 A1 | 5/2015 | Boccoleri et al. | | |
| 2017/0233582 A1* | 8/2017 | Zhao | ............ | C09D 5/006 |
| | | | | 353/77 |

FOREIGN PATENT DOCUMENTS

| | | |
|---|---|---|
| CN | 1643449 | 7/2005 |
| CN | 106125168 | 11/2016 |
| TW | 201326895 | 1/2013 |
| TW | 201326895 | 7/2013 |
| TW | 201426686 | 7/2014 |
| TW | M529177 | 9/2016 |
| WO | 9518393 | 7/1995 |
| WO | 2008134154 | 11/2008 |
| WO | 2017023057 | 2/2017 |
| WO | 2017108211 | 6/2017 |

\* cited by examiner

FIG. 8B

VIRTUAL REALITY DISPLAY APPARATUS

CROSS-REFERENCE TO RELATED APPLICATION

This application claims the priority benefit of Taiwan application serial no. 106118268, filed on Jun. 2, 2017. The entirety of the above-mentioned patent application is hereby incorporated by reference herein and made a part of this specification.

BACKGROUND OF THE INVENTION

Field of the Invention

The invention relates to a display apparatus, and in particular, a virtual reality display apparatus.

Description of Related Art

As the display technology advances, in pursuit of close-to-reality experiences, users are no longer satisfied with watching two-dimensional images. To provide users with visual entertainment of more sense of reality and stereoscopic sense, virtual reality (VR) has become a new trend in the current display technology. Virtual reality involves simulating a three-dimensional virtual scene to provide users with visual and other sensual experiences and enable users to watch three-dimensional images in real-time or even further interact with virtual images.

One example of the common virtual reality display apparatuses is the head mounted display (HMD), which is mounted on the head of a user. At this time, a display in the virtual reality display apparatus is quite close to the human eyes. To enable the human eyes to clearly see the images displayed by the display even in a close distance (i.e., to enable the image displayed by the display to be formed on the retina of human eyes), an optical component (e.g., a lens) is provided between the display and the human eyes to change a travel path of light through a refractive power thereof and form the image on the retina of the human eyes. Accordingly, the user is able to see the virtual images in front of his or her eyes and has a close-to-reality experience.

However, some surfaces of the optical component may cause part of the light from the display to travel without following the expected direction and path but to be reflected to an unexpected direction and result in stray light. The stray light affects the quality of the images that the user sees and lessens the visual experience of the user.

SUMMARY OF THE INVENTION

The invention provides a virtual reality display apparatus capable of effectively improving an issue of stray light.

An embodiment of the invention provides a virtual reality display apparatus including at least one display and at least one optical assembly. The display is configured to provide an image beam to a left eye or a right eye of a user. The optical assembly is disposed on a transmission path of the image beam and is located between the display and the left eye or the right eye of the user. The optical assembly includes at least one Fresnel lens including a plurality of ring structures surrounding an optical axis thereof. Each of the ring structures includes an effective refraction surface and an optically non-effective surface connected to each other and arranged along a radial direction. A junction of the effective refraction surface and the optically non-effective surface has a round angle. A radius of curvature of the round angles of at least some of the ring structures of the Fresnel lens is smaller than 10 μm and larger than 0 μm.

An embodiment of the invention provides a virtual reality display apparatus including at least one display and at least one optical assembly. The display is configured to provide an image beam to a left eye or a right eye of a user. The optical assembly is disposed on a transmission path of the image beam and is located between the display and the left eye or the right eye of the user. The optical assembly includes at least one Fresnel lens including a plurality of ring structures surrounding an optical axis thereof. Each of the ring structures includes an effective refraction surface and an optically non-effective surface connected to each other and arranged along a radial direction, wherein the optically non-effective surface includes at least one optical micro-structure.

In light of the above, the virtual reality display apparatus of the embodiments of the invention includes at least one display and at least one optical assembly, wherein the optical assembly includes at least one Fresnel lens. By configuring the radius of curvature of the round angles of at least some of the ring structures of the Fresnel lens to be smaller than 10 μm and larger than 0 μm, the phenomenon of the image beam being refracted to an unexpected direction and resulting in the stray light after being incident on the Fresnel lens from the round angle is reduced. The virtual reality display apparatus provided in another embodiment of the invention includes at least one display and at least one optical assembly, wherein the optical assembly includes a Fresnel lens including at least one optical micro-structure on an optically non-effective surface. Since the optical micro-structure on the optically non-effective surface scatters in a wide range the stray light generated by part of the image beam incident on the Fresnel lens from the optically non-effective surface or part of the image beam incident on the effective refraction surface and later refracted by the effective refraction surface to the optically non-effective surface, brightness of the stray light is reduced. Accordingly, the virtual reality display apparatus of the embodiments of the invention can effectively improve the issue of the stray light and further improve the quality of images that the user sees.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
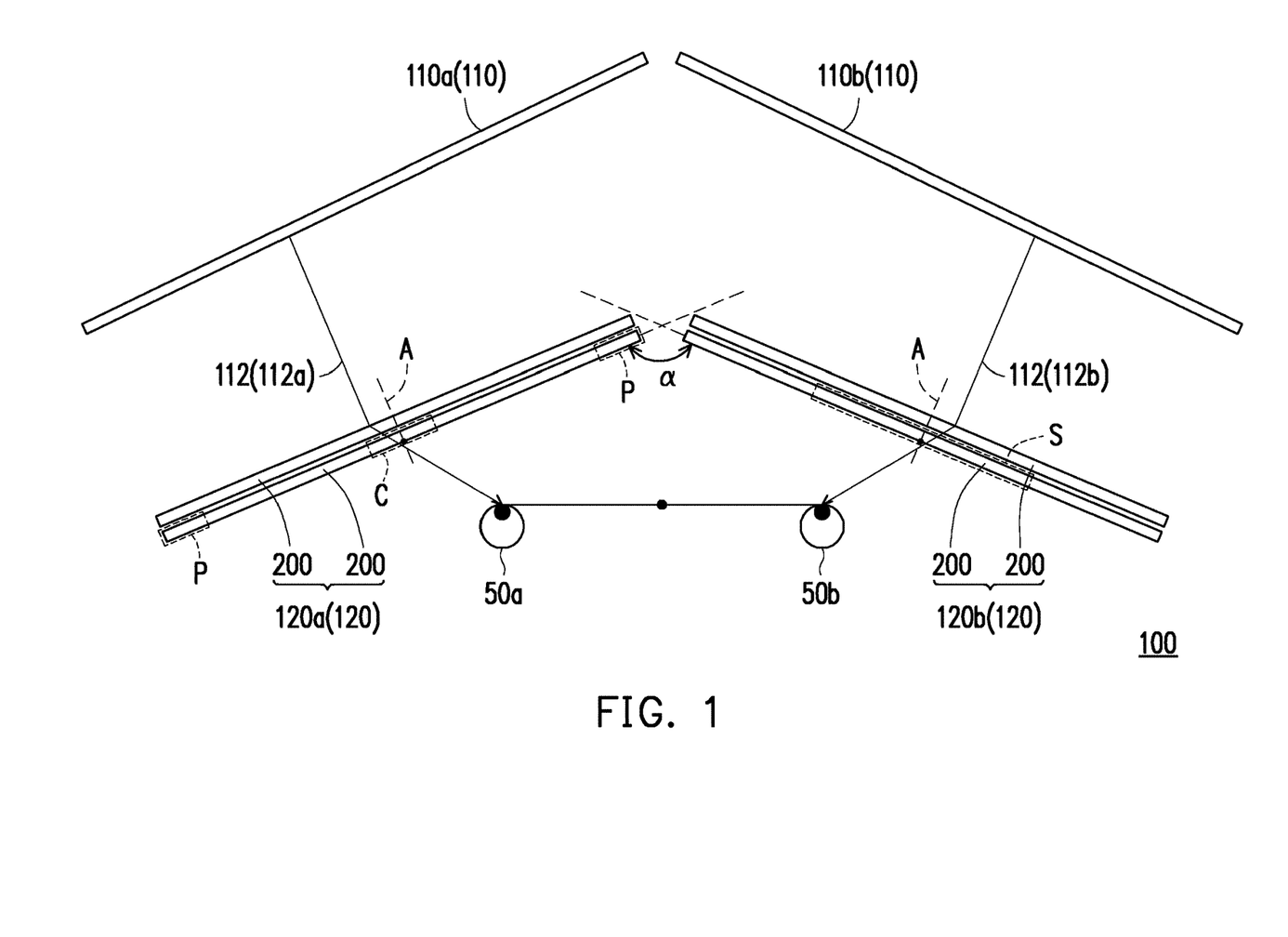
FIG. 1 is a cross-sectional schematic diagram illustrating a virtual reality display apparatus according to an embodiment of the invention.

FIG. 1 is a cross-sectional schematic diagram illustrating a virtual reality display apparatus according to an embodiment of the invention. Referring to FIG. 1, a virtual reality display apparatus 100 of the present embodiment includes at least one display 110 (FIG. 1 shows two displays 110a and 110b as an example) and at least one optical assembly 120 (FIG. 1 shows two optical assemblies 120a and 120b as an example). The display 110 is adapted to provide an image beam 112 to a left eye 50a or a right eye 50b of a user. The optical assembly 120 is disposed on a transmission path of the image beam 112 and is located between the display 110 and the left eye 50a or the right eye 50b of the user. In the present embodiment, the display 110a and the display 110b respectively provide two image beams 112a and 112b, and the image beam 112a and the image beam 112b are respectively transmitted to the left eye 50a and the right eye 50b of the user via the optical assembly 120a and the optical assembly 120b to form images on retinas of the left eye 50a and the right eye 50b. In the present embodiment, the display 110 is, for example, a liquid crystal display panel, an organic light-emitting diode (OLED) display panel, a light-emitting diode (LED) display panel, or another suitable display.

Figure 2A:
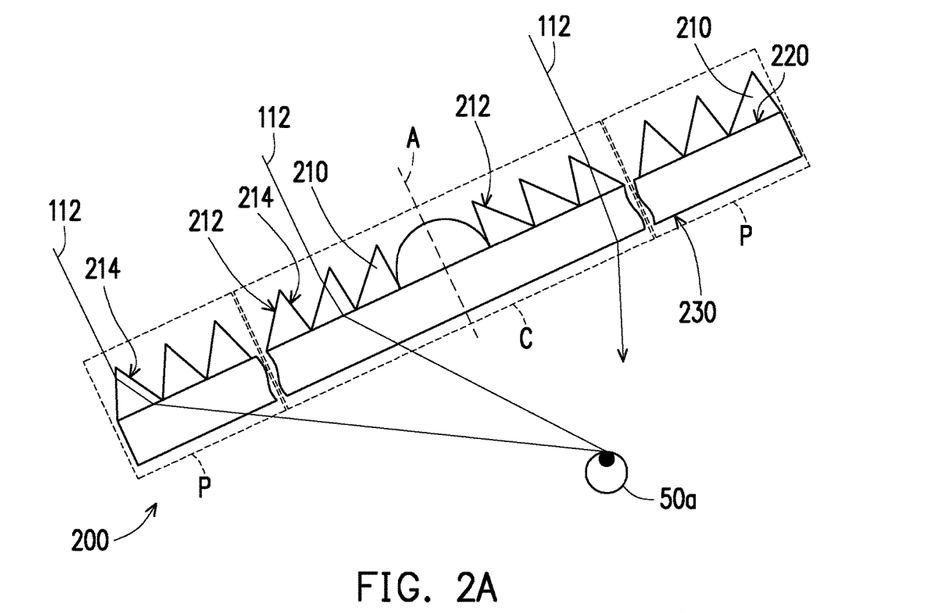
FIG. 2A and FIG. 2B are cross-sectional schematic diagrams illustrating a Fresnel lens in FIG. 1.

FIG. 2A is a partial cross-sectional schematic diagram illustrating a convex lens form of a Fresnel lens 200 in FIG. 1. There is actually a segment of a Fresnel lens structure between two adjacent S shapes of double-S symbols in FIG. 2A. However, to facilitate illustration of ring structures, FIG. 2A only schematically illustrates the Fresnel lens structure located in a central region C and a peripheral region P. Referring to FIG. 1 and FIG. 2A, in the present embodiment, each of the optical assemblies 120 includes at least one Fresnel lens 200 (FIG. 1 illustrates two Fresnel lenses 200 as an example) disposed on a transmission path of the image beam 112. The Fresnel lens 200 includes a plurality of ring structures 210 surrounding an optical axis A thereof, and each of the ring structures 210 includes an effective refraction surface 212 and an optically non-effective surface 214 connected to each other and arranged along a radial direction (i.e., a radius direction taking a position of the optical axis A as a center of circle and perpendicular to the optical axis A). In the present embodiment, the effective refraction surface 212 refers to a surface in the Fresnel lens 200 used to effectively refract light to generate effect of light convergence or light divergence. In the present embodiment, the Fresnel lens 200 is equivalent to a convex lens, and its effective refraction surface 212 exhibits light convergence effect. Moreover, in each of the ring structures 210, the optically non-effective surface 214 is disposed between the effective refraction surface 212 and the optical axis A. In addition, the optically non-effective surface 214 is used to connect two adjacent effective refraction surfaces 212 and does not contribute to expected effect of light convergence or light divergence of the Fresnel lens.

Figure 2B:
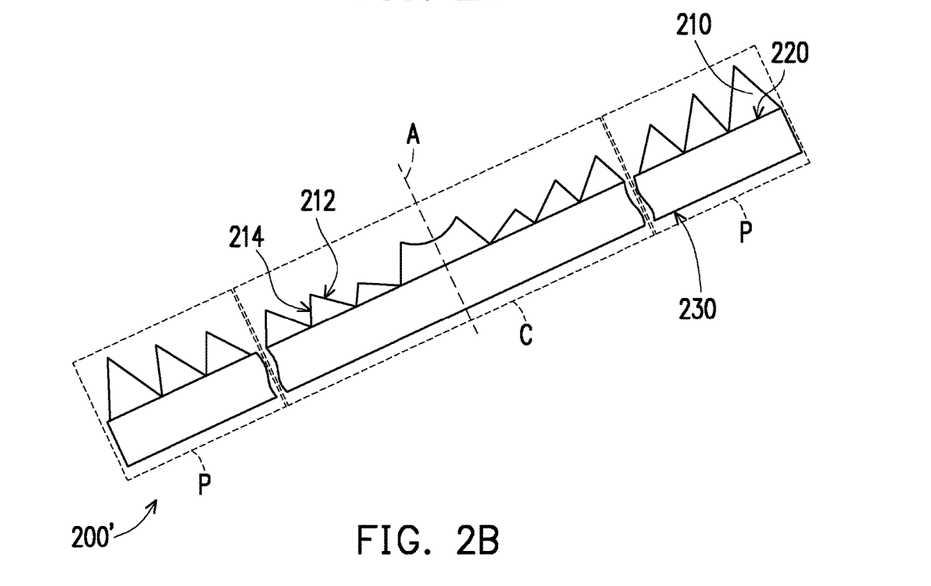
Figure 3:
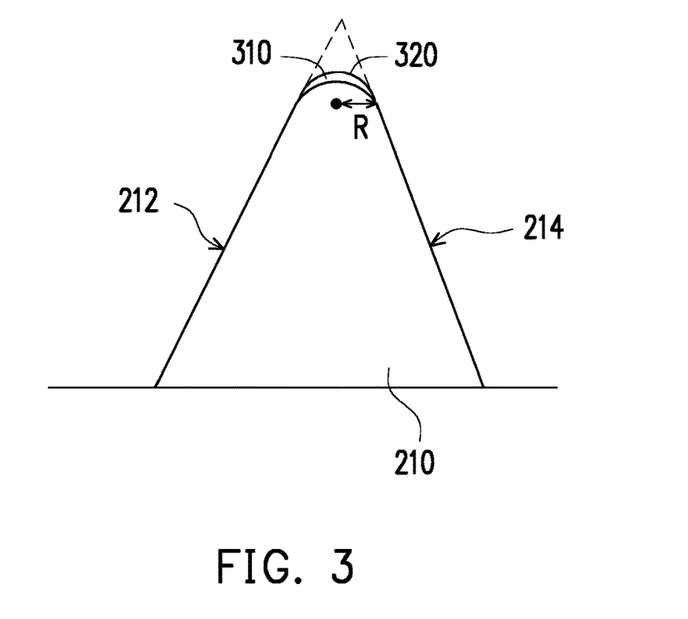
FIG. 3 is a partially enlarged schematic diagram illustrating a ring structure in FIG. 2A.

FIG. 3 is a partially enlarged schematic diagram illustrating one of the ring structures 210 of the Fresnel lens 200 in FIG. 2. The ring structure 210 includes the effective refraction surface 212 and the optically non-effective surface 214 connected to each other, and a junction of the effective refraction surface 212 and the optically non-effective surface 214 has a round angle 310. Since the round angle 310 is an arc structure generated after the Fresnel lens 200 is molded, it is actually impossible to manufacture an infinitely small sharp tip. When the image beam 112 is incident on the round angle 310, it is refracted to an unexpected direction and results in stray light. In the present embodiment, a radius of curvature R of the round angles 310 of at least some of the ring structures 210 of the Fresnel lens 200 is smaller than 10 µm and larger than 0 µm, which effectively reduces the stray light and further improves the quality of images that the user sees.

Specifically, the Fresnel lens of the present embodiment may be a convex lens. For example, as shown in FIG. 2A, the Fresnel lens 200 is a convex lens and includes a plurality of ring structures 210 surrounding the optical axis A thereof, and each of the ring structures 210 includes an effective refraction surface 212 and an optically non-effective surface 214 connected to each other and arranged along the radial direction, wherein the effective refraction surface 212 is located at a side away from the optical axis A and the optically non-effective surface 214 is located between the optical axis A and the effective refraction surface 212. FIG. 2B is a cross-sectional schematic diagram illustrating a concave lens form of a Fresnel lens according to another embodiment of the invention. The optical assembly 120 of another embodiment of the invention may also include at least one Fresnel lens in the concave lens form. As shown in FIG. 2B, a Fresnel lens 200' is a concave lens and includes a plurality of ring structures 210 surrounding the optical axis A thereof, and each of the ring structures 210 includes an effective refraction surface 212 and an optically non-effective surface 214 connected to each other and arranged along the radial direction, wherein the optically non-effective surface 214 is located at a side away from the optical axis A and the effective refraction surface 212 is located between the optical axis A and the optically non-effective surface 214. The invention does not limit the form of the Fresnel lens.

In an embodiment of the invention, the radius of curvature R of the round angles 310 of at least some of the ring structures 210 of the Fresnel lens 200 is smaller than 5 µm and larger than 0 µm.

Figure 4:
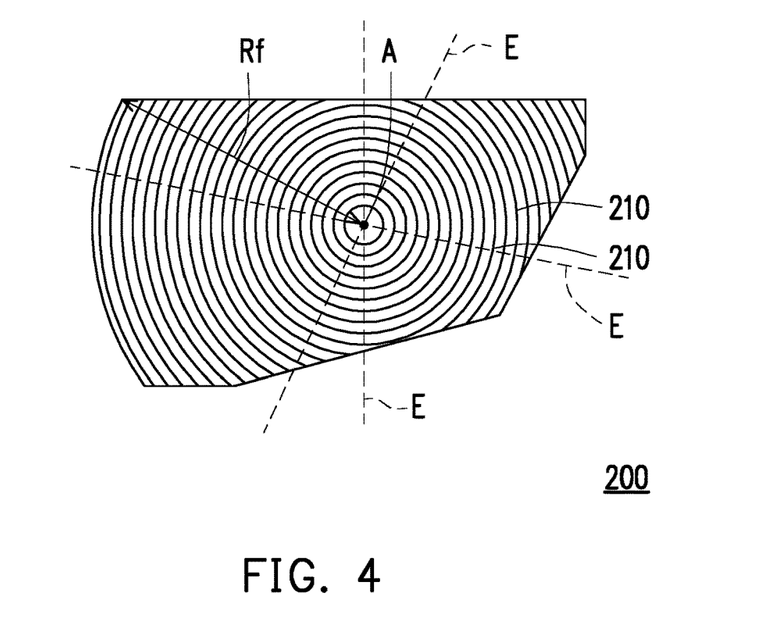
FIG. 4 is a front schematic diagram illustrating the Fresnel lens in FIG. 1.

Referring to FIG. 1 again, a range of the Fresnel lens 200 within 0.5 times of a radius Rf starting from the optical axis A and perpendicular to the optical axis A is a specific region S, wherein the radius Rf is defined as a distance (as shown in FIG. 4) from the optical axis A to a position of the Fresnel lens 200 farthest away from the optical axis A (e.g., a corner farthest away from the optical axis A), and the radius Rf is perpendicular to the optical axis A. In another embodiment of the invention, the radius of curvature R of the round angle 310 of each of the ring structures 210 in the specific region S is smaller than 10 µm and larger than 0 µm. In still another embodiment of the invention, the radius of curvature R of the round angle 310 of each of the ring structures 210 of the Fresnel lens 200 is smaller than 10 µm and larger than 0 µm.

Figure 5A:
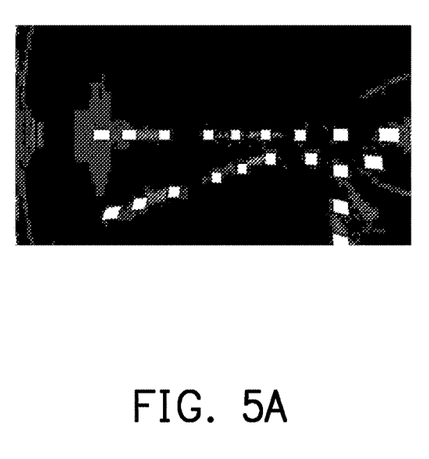
FIG. 5A, FIG. 5B, and FIG. 5C are diagrams illustrating optical simulation results according to some embodiments of the invention.
Figure 5B:
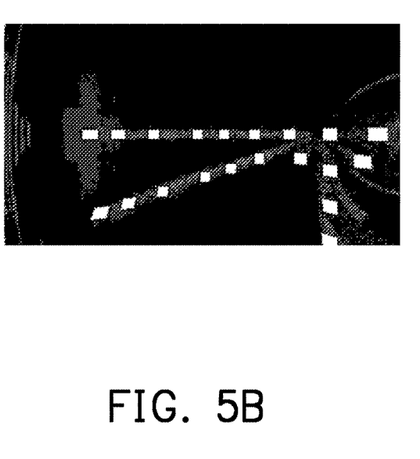
Figure 5C:
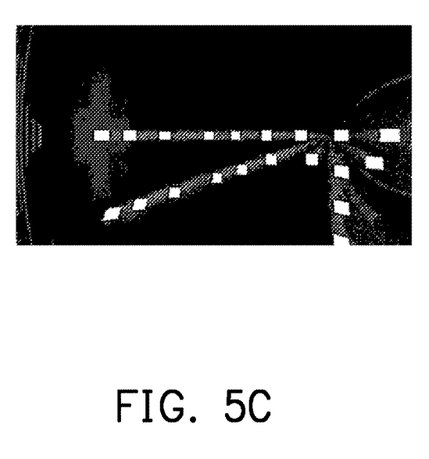

FIG. 5A illustrates an optical simulation result of an embodiment of the invention where the radius of curvature R of the round angle 310 of each of the ring structures 210 is 0 µm. FIG. 5B illustrates an optical simulation result of another embodiment of the invention where the radius of curvature R of the round angle 310 of each of the ring structures 210 is 3 µm. FIG. 5C illustrates an optical simulation result of still another embodiment of the invention where the radius of curvature R of the round angle 310 of each of the ring structures 210 is 6 µm. Please refer to FIG. 5A, FIG. 5B, and FIG. 5C at same time. When the radius of curvature R of the round angle 310 of each of the ring structures 210 is 0 μm, a simulated signal-to-noise ratio is 20.13. When the radius of curvature R of the round angle 310 of each of the ring structures 210 is 3 μm, a simulated signal-to-noise ratio is 18.16. When the radius of curvature R of the round angle 310 of each of the ring structures 210 is 6 μm, a simulated signal-to-noise ratio is 14.52. The foregoing signal-to-noise ratio is a ratio of a signal light intensity to a stray light intensity. Therefore, a greater signal-to-noise ratio means a lower intensity of the stray light. According to the optical simulation results above, when the radius of curvature R of the round angle 310 of the ring structure 210 is smaller, the simulated signal-to-noise ratio is larger, which means the intensity of the stray light is lower. In addition, according to the optical simulation results of FIG. 5A, FIG. 5B, and FIG. 5C, as the radius of curvature R of the round angle 310 becomes smaller, the white fog around test points in the figures (i.e., quadrilateral light areas in the figures, which are correct images) becomes less and less obvious. In other words, when the radius of curvature R of the round angle 310 of the ring structures 210 becomes smaller, the stray light is effectively reduced and the quality of images that the user sees is further improved.

Referring to FIG. 3 again, in the present embodiment, the round angles 310 of the ring structures 210 of the Fresnel lens 200 are respectively covered with light-absorbing material layers 320. When the image beam 112 is incident on the round angle 310, it is absorbed by the light-absorbing material layer 320 and cannot pass the optical assembly 120, which thereby effectively reduces the stray light and improves the quality of images that the user sees.

A material of the light-absorbing material layer 320 is, for example, a black ink, a resin doped with a black toner, or another suitable material. However, the invention does not limit a type of material or a method of coating of the light-absorbing material layer 320, which can be adequately selected by people of ordinary skill in the art according to the actual application situation.

Referring to FIG. 2A again, in the present embodiment, the Fresnel lens 200 includes a first surface 220 facing the display and a second surface 230 opposite to the first surface 220, and the ring structures 210 are located on at least one of the first surface 220 and the second surface 230 (FIG. 2A illustrates the ring structures 210 only on the first surface 220 as an example). Specifically, the ring structures 210 may be located on the first surface 220 only, may be located on the second surface 230 only, or may be located on the first surface 220 and the second surface 230, which is not limited in the invention.

Referring to FIG. 1 again, in the present embodiment, the at least one optical assembly 120 is two optical assemblies, which are respectively the optical assembly 120a corresponding to the left eye 50a of the user and the optical assembly 120b corresponding to the right eye 50b of the user. An overlapped vision angle of the two eyes is about 124 degrees. Humans can experience the three-dimensional vision angle within this range, and the essential vision angle is specifically about 60 degrees. Therefore, the three-dimensional vision angle for the two eyes should be designed to be 60 degrees to 120 degrees. In the present embodiment, there is an included angle α between the optical assembly 120a corresponding to the left eye 50a of the user and the optical assembly 120b corresponding to the right eye 50b of the user. A range of the included angle α may be designed to be larger than or equal to 130 degrees and is smaller than or equal to 180 degrees to obtain a more desirable three-dimensional vision angle.

Figure 6A:
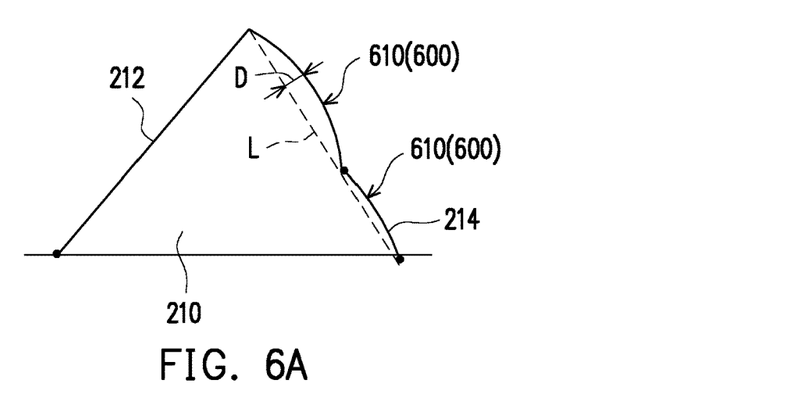
FIG. 6A, FIG. 6B, FIG. 6C, FIG. 6D, FIG. 6E, FIG. 6F, and FIG. 6G are cross-sectional schematic diagrams illustrating part of the ring structure according to some embodiments of the invention.
Figure 6B:
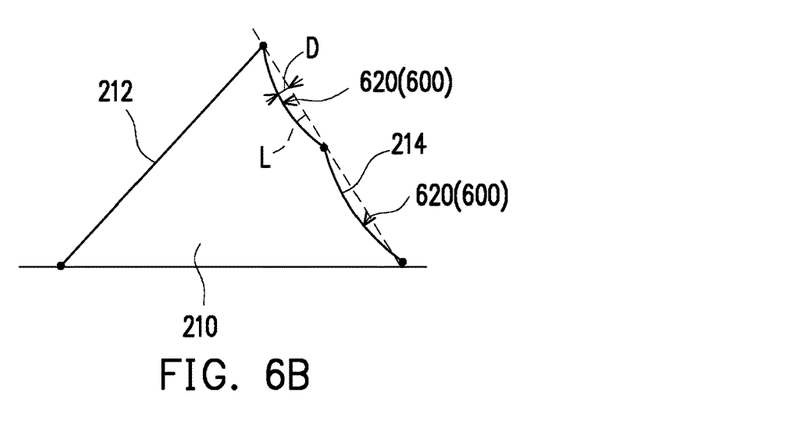
Figure 6C:
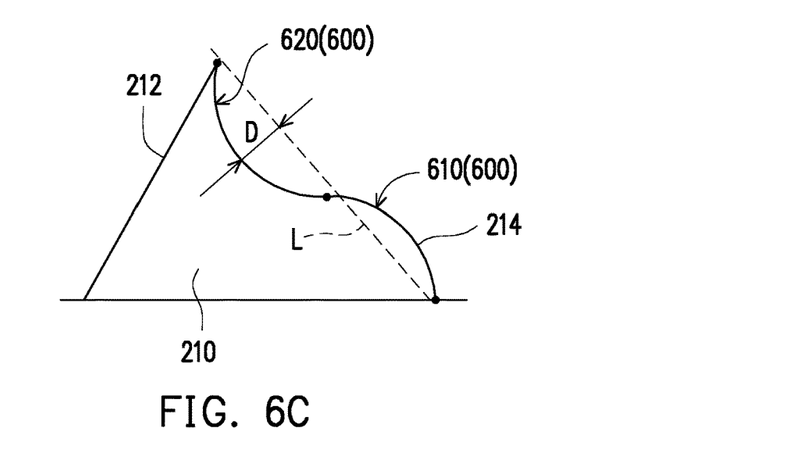

The foregoing features of the round angles 310 of the ring structures 210 are meant to lower the possibility of refracting the image beam 112 to an unexpected direction and resulting in the stray light after the image beam 112 is incident on the Fresnel lens 200 from the round angle 310. However, another cause for generating the stray light is that part of the image beam 112 is incident on the Fresnel lens 200 from the optically non-effective surface 214 and is refracted or reflected by the optically non-effective surface 214 as the stray light. Alternatively, after part of the image beam 112 is incident on the effective refraction surface 212, it is refracted by the effective refraction surface 212 to the optically non-effective surface 214 and is further refracted or reflected by the optically non-effective surface 214 as the stray light. FIG. 6A, FIG. 6B, and FIG. 6C are cross-sectional schematic diagrams illustrating part of the ring structure 210 according to some embodiments of the invention. Referring to FIG. 6A, FIG. 6B, and FIG. 6C, to resolve the issue of the stray light generated in this manner, in the present embodiment, the optically non-effective surface 214 includes at least one optical micro-structure 600. The optical micro-structure 600 scatters in a wide range the stray light generated by the image beam 112 incident on the optically non-effective surface 214 and can thereby effectively reduce brightness of the stray light and improve the quality of images that the user sees.

All straight connecting lines L from the junction of the optically non-effective surface 214 and the effective refraction surface 212 to a side of the optically non-effective surface 214 away from the junction form a reference curved surface, and all the straight connecting lines are respectively located on a plurality of planes E including the optical axis A (i.e., planes E including the optical axis A and respectively extending toward all directions perpendicular to the optical axis A; FIG. 4 schematically illustrates three of the planes E as examples). In the present embodiment, a perpendicular distance D from at least one position on surfaces of the optical micro-structures 600 to the reference curved surface is larger than 0.1 μm.

Referring to FIG. 6A, FIG. 6B, and FIG. 6C again, in the present embodiment, the number of the optical micro-structures 600 on the optically non-effective surface 214 is plural, and the optical micro-structures 600 on the optically non-effective surface 214 include bending protrusions 610 (as in FIG. 6A), bending recessions 620 (as in FIG. 6B), or a combination thereof (as in FIG. 6C). However, the invention is not limited hereto.

Figure 6D:
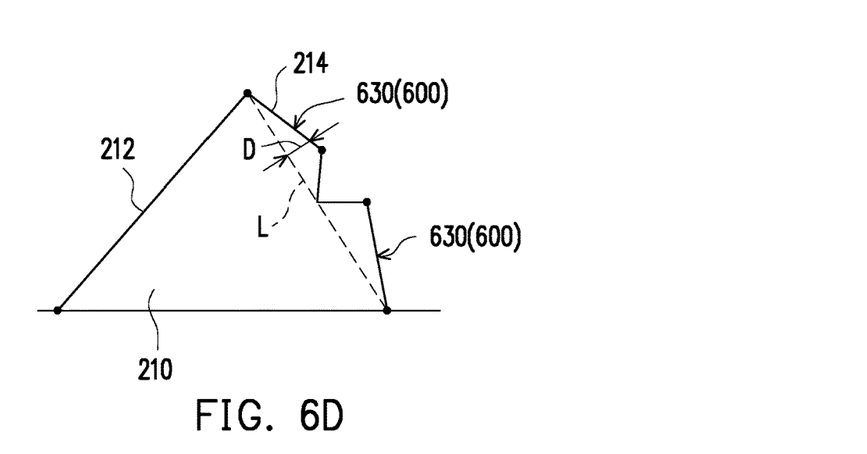
Figure 6E:
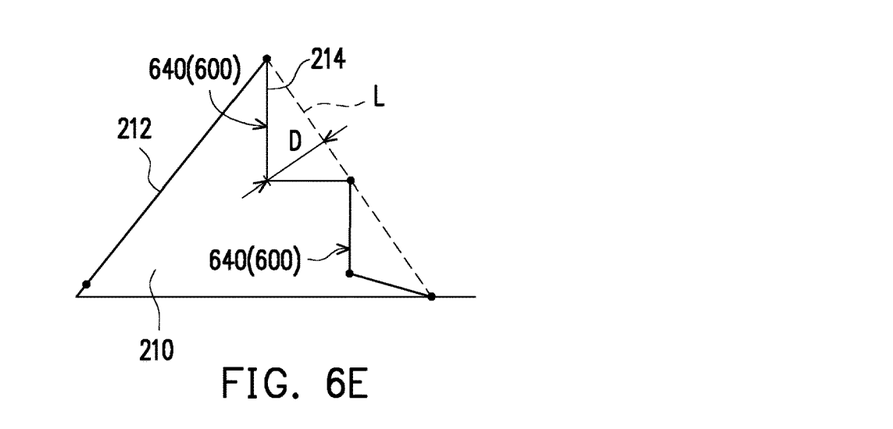
Figure 6F:
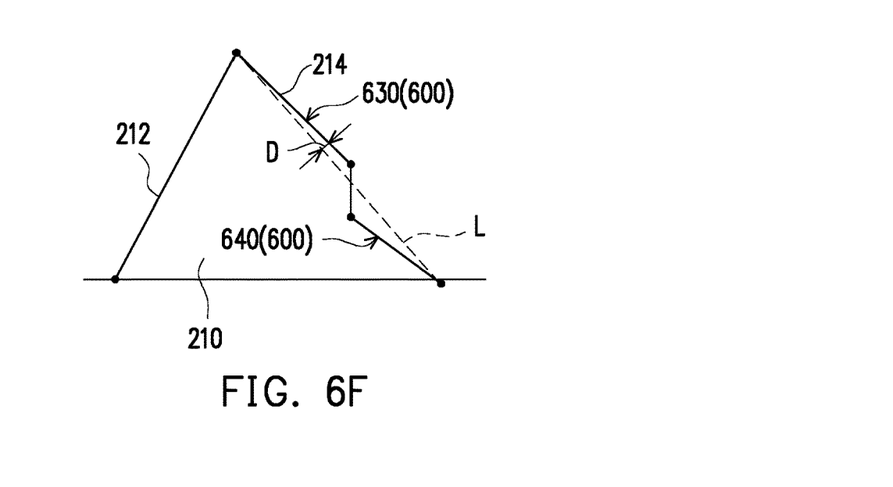

FIG. 6D, FIG. 6E, and FIG. 6F are cross-sectional schematic diagrams illustrating part of the ring structure 210 according to some other embodiments of the invention. Referring to FIG. 6D, in the present embodiment, the optical micro-structures 600 on the optically non-effective surface 214 include protrusions 630 of which a cross-section on the plane E including the optical axis is a polygon (as in FIG. 6D), recessions 640 of which a cross-section on the plane E including the optical axis is a polygon (as in FIG. 6E), or a combination thereof (as in FIG. 6F). However, the invention is not limited hereto.

Figure 6G:
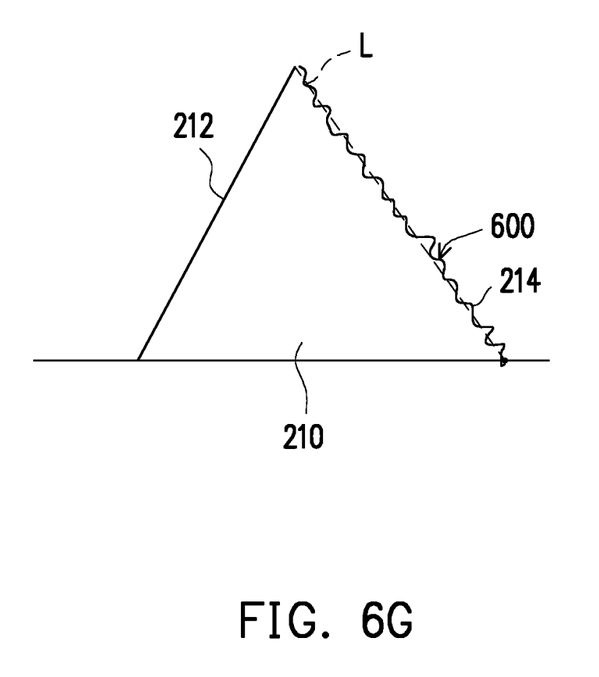

FIG. 6G is a cross-sectional schematic diagram illustrating part of the ring structure 210 according to another embodiment of the invention. Referring to FIG. 6G, in the present embodiment, at least one of the optical micro-structures 600 on the optically non-effective surface 214 forms a rough haze surface, and the roughness $R_a$ of the haze surface is larger than 0.1 μm.

Figure 7A:
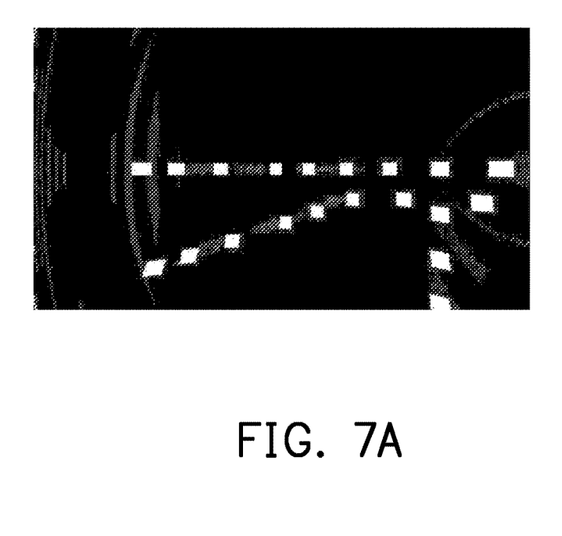
FIG. 7A and FIG. 7B are diagrams illustrating optical simulation results according to some other embodiments of the invention.
Figure 7B:
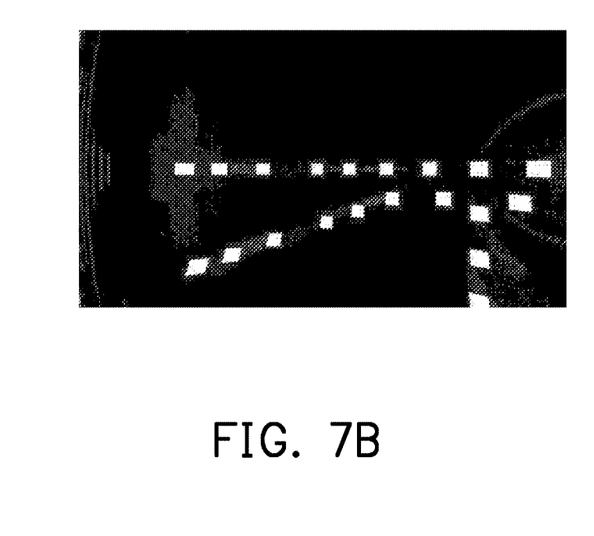

FIG. 7A illustrates an optical simulation result of an embodiment of the invention where the optically non-effective surface 214 does not include the optical microstructure 600 thereon. FIG. 7B illustrates an optical simulation result of another embodiment of the invention where the optically non-effective surface 214 includes an arc-shaped optical micro-structure 600 thereon. According to FIG. 7A and FIG. 7B, after the image beam 112 is incident on the Fresnel lens 200 in which the optically non-effective surface 214 does not include the optical micro-structure 600 thereon, the intensity of the generated stray light is more concentrated, the simulated signal-to-noise ratio is 4.73, and the brightness of the stray light is higher. In contrast, after the image beam 112 is incident on the Fresnel lens 200 in which the optically non-effective surface 214 includes the arc-shaped optical micro-structure 600 thereon, the generated stray light is more scattered, the simulated signal-to-noise ratio is 20.13, and the brightness of the stray light is lower. According to the foregoing optical simulation results, the optical micro-structure 600 of the optically non-effective surface 214 scatters in a wide range the stray light generated by the image beam 112 incident on the optically non-effective surface 214 and can thereby reduce the brightness of the stray light and further improve the quality of images that the user sees.

Figure 8A:
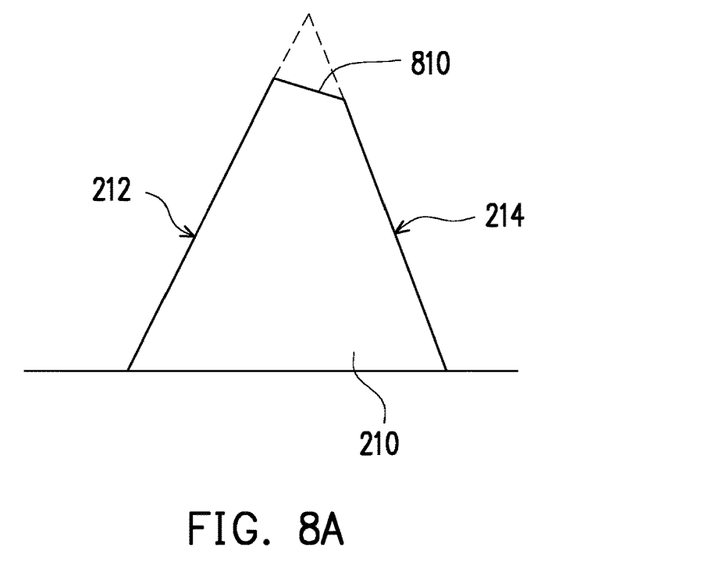
FIG. 8A and FIG. 8B are partially enlarged schematic diagrams illustrating a ring structure according to some other embodiments of the invention.
Figure 8B:
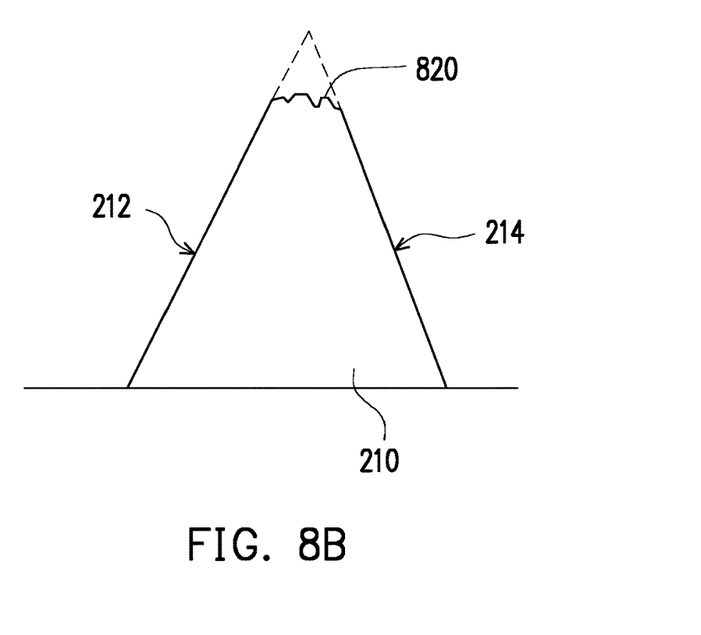

FIG. 8A and FIG. 8B are partially enlarged schematic diagrams illustrating one of the ring structures 210 of the Fresnel lens 200 according to some other embodiments of the invention. Referring to FIG. 8A and FIG. 8B, the junction of the effective refraction surface 212 and the optically non-effective surface 214 of the ring structure 210 may also has a chamfer 810 (as in FIG. 8A) or a tip 820 in an irregular shape (as in FIG. 8B). However, the invention is not limited hereto.

In light of the above, the Fresnel lens 200 of the present embodiment adopts the foregoing three designs to improve the stray light. The first is the design of the radius of curvature R of the round angles 310 of the ring structures 210. The second is the design of adopting the light-absorbing material layer 320 to respectively cover the round angles 310 of the ring structures 210. The third is the design of the optically non-effective surface 214 including the optical micro-structure 600. Through the foregoing three designs for improving the issue of the stray light, the situations where white fog appears in the image, streaking appears in the image, and obvious concentric circular interface marks appear in the image are effectively reduced. However, in other embodiments, the Fresnel lens 200 may also adopt any one or two of the foregoing three designs to similarly achieve the effect of reducing the stray light.

In summary of the above, in the virtual reality display apparatus of the embodiments of the invention, since the radius of curvature of the round angles of at least some of the ring structures of the Fresnel lens is smaller than 10 μm and larger than 0 μm, the phenomenon of the image beam being refracted to the unexpected direction and resulting in the stray light after being incident on the Fresnel lens from the round angles is reduced. In addition, the optical assembly of the embodiments of the invention includes the Fresnel lens including at least one optical micro-structure on the optically non-effective surface. Since the optical micro-structure on the optically non-effective surface scatters in a wide range the stray light generated by the image beam incident on the optically non-effective surface, the brightness of the stray light is reduced. Accordingly, the virtual reality display apparatus of the embodiments of the invention can effectively improve the issue of the stray light and further improve the quality of images that the user sees.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. A virtual reality display apparatus comprising:
at least one display configured to provide an image beam to a left eye or a right eye of a user; and
at least one optical assembly disposed on a transmission path of the image beam and located between the display and the left eye or the right eye of the user, wherein the optical assembly comprises at least one Fresnel lens comprising a plurality of ring structures surrounding an optical axis thereof, each of the ring structures comprises an effective refraction surface and an optically non-effective surface connected to each other and arranged along a radial direction, and a junction of the effective refraction surface and the optically non-effective surface has a round angle, wherein a radius of curvature of round angles of at least some of the ring structures of the Fresnel lens is smaller than 10 μm and larger than 0 μm, wherein the at least one optical assembly is two optical assemblies, an included angle is between an optical assembly corresponding to the left eye of the user and an optical assembly corresponding to the right eye of the user, and a range of the included angle is larger than or equal to 130 degrees and is smaller than or equal to 180 degrees.

2. The virtual reality display apparatus of claim 1, wherein the radius of curvature of the round angles of at least some of the ring structures of the Fresnel lens is smaller than 5 μm and larger than 0 μm.

3. The virtual reality display apparatus of claim 1, wherein a range of the Fresnel lens within 0.5 times of a radius starting from the optical axis and perpendicular to the optical axis is a specific region, and a radius of curvature of a round angle of each of ring structures in the specific region is smaller than 10 μm and larger than 0 μm.

4. The virtual reality display apparatus of claim 1, wherein a radius of curvature of a round angle of each of the ring structures of the Fresnel lens is smaller than 10 urn and larger than 0 μm.

5. The virtual reality display apparatus of claim 1, wherein round angles of the ring structures of the Fresnel lens are respectively covered with light-absorbing material layers.

6. The virtual reality display apparatus of claim 1, wherein the Fresnel lens comprises a first surface facing the display and a second surface opposite to the first surface, and the ring structures are located on at least one of the first surface and the second surface.

7. The virtual reality display apparatus of claim 1, wherein the optically non-effective surface comprises at least one optical micro-structure.

8. The virtual reality display apparatus of claim 7, wherein all straight connecting lines from the junction of the optically non-effective surface and the effective refraction surface to a side of the optically non-effective surface away from the junction form a reference curved surface, all the straight connecting lines are respectively located on a plurality of planes including the optical axis, and a perpendicular distance from at least one position on a surface of the at least one optical micro-structure to the reference curved surface is larger than 0.1 μm.

9. The virtual reality display apparatus of claim 8, wherein the at least one optical micro-structure comprises a bending protrusion, a bending recession, or a combination thereof.

10. The virtual reality display apparatus of claim 8, wherein the at least one optical micro-structure comprises a protrusion of which a cross-section on the plane including the optical axis is a polygon, a recession of which a cross-section on the plane including the optical axis is a polygon, or a combination thereof.

11. The virtual reality display apparatus of claim 7, wherein the at least one optical micro-structure forms a rough haze surface, and a roughness $R_a$ of the haze surface is larger than 0.1 μm.

12. A virtual reality display apparatus comprising:
at least one display configured to provide an image beam to a left eye or a right eye of a user; and
at least one optical assembly disposed on a transmission path of the image beam and located between the display and the left eye or the right eye of the user, wherein the optical assembly comprises at least one Fresnel lens comprising a plurality of ring structures surrounding an optical axis thereof, and each of the ring structures comprises an effective refraction surface and an optically non-effective surface connected to each other and arranged along a radial direction, wherein the optically non-effective surface comprises at least one optical micro-structure, wherein the at least one optical assembly is two optical assemblies, an included angle is between an optical assembly corresponding to the left eye of the user and an optical assembly corresponding to the right eye of the user, and a range of the included angle is larger than or equal to 130 degrees and is smaller than or equal to 180 degrees.

13. The virtual reality display apparatus of claim 12, wherein all straight connecting lines from a junction of the optically non-effective surface and the effective refraction surface to a side of the optically non-effective surface away from the junction form a reference curved surface, all the straight connecting lines are respectively located on a plurality of planes including the optical axis, and a perpendicular distance from at least one position on a surface of the at least one optical micro-structure to the reference curved surface is larger than 0.1 μm.

14. The virtual reality display apparatus of claim 13, wherein the at least one optical micro-structure comprises a bending protrusion, a bending recession, or a combination thereof.

15. The virtual reality display apparatus of claim 13, wherein the at least one optical micro-structure comprises a protrusion of which a cross-section on the plane including the optical axis is a polygon, a recession of which a cross-section on the plane including the optical axis is a polygon, or a combination thereof.

16. The virtual reality display apparatus of claim 12, wherein the at least one optical micro-structure forms a rough haze surface, and a roughness $R_a$ of the haze surface is larger than 0.1 μm.

17. The virtual reality display apparatus of claim 12, wherein the Fresnel lens comprises a first surface facing the display and a second surface opposite to the first surface, and the ring structures are located on at least one of the first surface and the second surface.

18. The virtual reality display apparatus of claim 12, wherein a junction of the effective refraction surface and the optically non-effective surface of the ring structure comprises a round angle, a chamfer, or a tip in an irregular shape.

* * * * *